Feb. 6, 1962    L. D. KLEISS    3,020,490
PROCESS CONTROLLER
Filed Nov. 21, 1957    2 Sheets-Sheet 1

INVENTOR.
L. D. KLEISS

BY *Hudson & Young*

ATTORNEYS

Feb. 6, 1962 L. D. KLEISS 3,020,490
PROCESS CONTROLLER
Filed Nov. 21, 1957 2 Sheets-Sheet 2

INVENTOR.
L. D. KLEISS
BY Hudson & Young
ATTORNEYS

United States Patent Office 3,020,490
Patented Feb. 6, 1962

3,020,490
PROCESS CONTROLLER
Louis D. Kleiss, Borger, Tex., assignor to Phillips Petroleum Company, a corporation of Delaware
Filed Nov. 21, 1957, Ser. No. 697,881
13 Claims. (Cl. 330—85)

This invention relates to improved process controllers incorporating multiple lags in the reset feedback paths.

In nearly all fields of industry, automatic controllers are used extensively to regulate processes to obtain high purity products and more efficient operation. Increasing use is presently being made of analyzers which measure a property representative of a sample stream that is actually representative of the composition of the stream. Examples of such analyzers include differential refractometers, mass spectrometers, infrared analyzers and the like. While these analyzers provide accurate information regarding the composition of the sample stream, the response generally is not instantaneous due to time lags in the sampling system. These time lags can cause the controller to overcorrect a process variable which results in "hunting."

In accordance with the present invention, an improved controller is provided to minimize the effect of delays in the analyzer output response. This controller has a plurality of series connected delay means incorporated in the reset feedback path which can be adjusted to compensate for lags in the analyzer response. In a first embodiment of this controller, the delay means comprise restrictions and storage tanks in a pneumatic feedback network. In a second embodiment of the controller, the delay means comprise RC circuits in an electrical controller. Controllers which are presently available commercially can readily be modified to provide controllers in accordance with this invention.

Accordingly, it is an object of this invention to provide an improved controller which is capable of compensating for lags in the response of an analysis instrument.

Another object is to provide a process controller incorporating multiple lags in a reset feedback path.

A further object is to provide an improved controller which can readily be constructed from conventional commercially available controllers.

Other objects, advantages and features of the invention should become apparent from the following detailed description which is taken in conjunction with the accompanying drawing in which.

Figure 1:
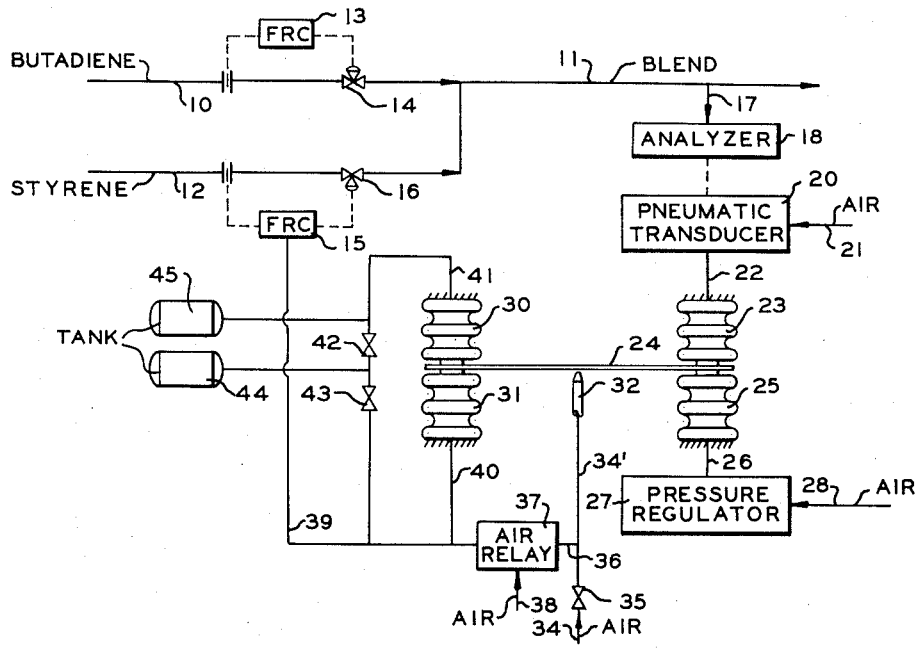
FIGURE 1 is a schematic representation of a fluid blending system having the controller of this invention incorporated therein.

Referring now to the drawing in detail, and to FIGURE 1 in particular, there is shown a fluid blending system which is employed in the manufacture of synthetic rubber by the copolymerization of butadiene and styrene. Butadiene is introduced into the system through a conduit 10 which communicates with an outlet conduit 11. Styrene is introduced through a conduit 12 which also communicates with conduit 11. It is desired that the composition of the blended stream in conduit 11 have a predetermined ratio of butadiene to styrene. Because substantial amounts of butadiene and styrene are recycled from the reactors, the feed streams, which are a blend of fresh and recycle streams, do not always have constant compositions. It is thus necessary to provide some kind of control system to maintain the composition of the blended stream at a desired value. This is accomplished in accordance with the present invention by analyzing the blended stream to determine the composition thereof. In response to this determination, flow of one of the streams, styrene, for example, is adjusted as required to maintain the composition of the blended stream constant.

The flow through conduit 10 is maintained at a predetermined rate by means of a flow controller 13 which adjusts a control valve 14. A flow controller 15 adjusts a control valve 16 in conduit 12 to maintain a selected rate of flow through conduit 12. A sample of the stream flowing through conduit 11 is directed through a conduit 17 to the inlet of an analyzer 18. Analyzer 18 can advantageously be a differential refractometer which provides an output electrical signal representative of the refractive index of the blended stream in conduit 11. This electrical signal is applied to a pneumatic transducer 20 which is supplied with air at a predetermined pressure by means of a conduit 21. Transducer 20 provides an output air pressure in a conduit 22 which is representative of the input signal applied to the transducer from analyzer 18. This pneumatic pressure is applied to the interior of a first bellows 23 which is fixed at its upper end and which presses against a flapper plate 24 at its lower end. A second bellows 25 is positioned beneath bellows 23 to exert an upward force on flapper plate 24 in opposition to the downward force exerted by bellows 23. Bellows 25 is fixed at its lower end, and the interior thereof is connected by a conduit 26 to an adjustable pressure regulator 27 which is supplied with air under pressure from a conduit 28. Pressure regulator 27 can be adjusted so that a predetermined set point force is exerted by bellows 25.

The second end of flapper plate 24 is disposed between opposing bellows 30 and 31 which are fixed at their upper and lower ends, respectively. A nozzle 32 is disposed beneath flapper plate 24 so that movement of the flapper plate changes the effective opening of nozzle 32. Air under pressure is applied to nozzle 32 by means of series connected conduits 34 and 34' which are separated by a restriction 35. A conduit 36 communicates between conduit 34' and the inlet of an air relay 37. Air under pressure is supplied to relay 37 by means of a conduit 38. The output pressure of relay 37 is applied by means of a conduit 39 to flow controller 15 so as to reset this controller in accordance with the output pressure from relay 37. The interior of bellows 31 is connected to conduit 39 by means of a conduit 40. The interior of bellows 30 is connected to conduit 39 by means of a conduit 41 which has valves 42 and 43 therein. A first storage tank 44 communicates with conduit 41 between valves 42 and 43, and a second storage tank 45 communicates with conduit 41 between valve 42 and bellows 30.

If the refractive index of the blended stream in conduit 11 should change, the pressure in conduit 22, which is supplied to bellows 23, changes in a corresponding manner. If this pressure should increase, bellows 23 tends to expand to move plate 24 downwardly. This tends to block nozzle 32 to increase the pressure in conduit 34'. A corresponding increased pressure is applied by conduit 39 through relay 37 to reset flow controller 15. Controller 15 is reset in a manner so as to change the flow of styrene by an amount sufficient to restore the refractive index of the blended stream to a desired set value. The increased pressure in conduit 39 is applied by conduit 40 to the interior of bellows 31 to tend to move plate 24 upwardly. This corresponds to negative feedback in the controller. The increased pressure in conduit 39 is also applied by conduit 41 to the interior of bellows 30. This pressure tends to move plate 24 downwardly and constitutes positive feedback. However, this latter force does not operate instantaneously because of the restrictions offered by valves 42 and 43. These two valves and the associated tanks 44 and 45 provide lag in the reset feedback path in accordance with the present invention.

If the refractive index should change in the opposite direction from that previously described, the pressure in conduit 22 is decreased and the above described pressures and movements are all reversed.

Figure 2A:
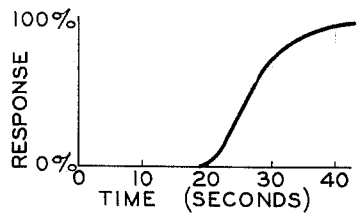
FIGURES 2a, 2b and 2c are graphical representations of operating features of the controller of this invention.
Figure 2B:
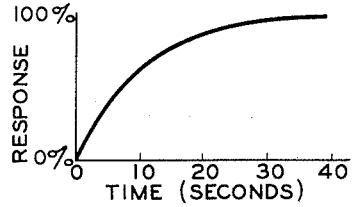

As previously mentioned, a time lag is inherent in the operation of analyzer 18. The output response of this analyzer to a sudden change in refractive index in conduit 11 is not instantaneous, but rather lags the change by a definite time interval. In one particular application of this control system, the time lag of analyzer 18, which was a differential refractometer, was of the order of 25 seconds. The output response of this analyzer as a function of time is illustrated schematically in FIGURE 2a. In order for a controller to provide an accurate correction in a process, it is necessary that the feedback path accurately simulate the process being measured. The process simulation feedback paths in conventional controllers employed heretofore have corresponded to a single RC time lag in an electrical network. Electrical controllers commonly employ a resistor and a capacitor to provide this lag, and pneumatic controllers commonly employ needle valves and air tanks. The overall response of reset feedback networks in such a conventional controller is represented by the following formula:

$$\text{Response} = 1 - e^{-\frac{t}{T}}$$

where $e$ is the base of natural logarithms, $t$ is the elapsed time, and $T$ is the time constant, RC for an electrical delay network. This response is shown graphically in FIGURE 2b. It can readily be seen that FIGURES 2a and 2b have little similarity.

The present invention incorporates a plurality of time lag means in the positive feedback path. The responses of a plurality of such time lags in series are represented by the following formula:

$$\text{Response} = \left[1 - e^{-\frac{t}{T}}\right]^n$$

where $n$ is the number of time lags.

Figure 2C:
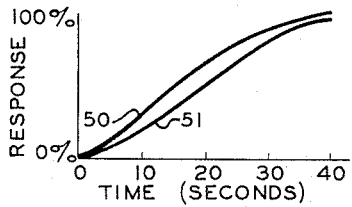

Two curves 50 and 51, corresponding to two and three time lags, respectively, are illustrated in FIGURE 2c. While the curves of FIGURE 2c are not exactly the same as FIGURE 2a, it can be seen that these curves much more nearly approximate the curve of FIGURE 2a than does the curve of FIGURE 2b. The overall response of a controller incorporating two or more time lags is thus a decided improvement over conventional controllers incorporating only a single time lag. In the controller of FIGURE 1, the first time lag is provided by restriction 43 and tank 44, and the second time lag is provided by restriction 42 and tank 45. It is desired that each succeeding air restriction offer a progressively greater restriction to the flow of air so as to minimize the effect of loading by downstream stages. Thus, valve 43 is opened wider than valve 42. It is also desirable that tank 44 be larger than tank 45. It should be evident that an increased number of lags increases the accuracy of the response. However, additional lags result in a more complex instrument and in somewhat greater difficulty in obtaining an accurate adjustment. It has been found that the two time lags provide satisfactory response in the control system of FIGURE 1.

Figure 3:
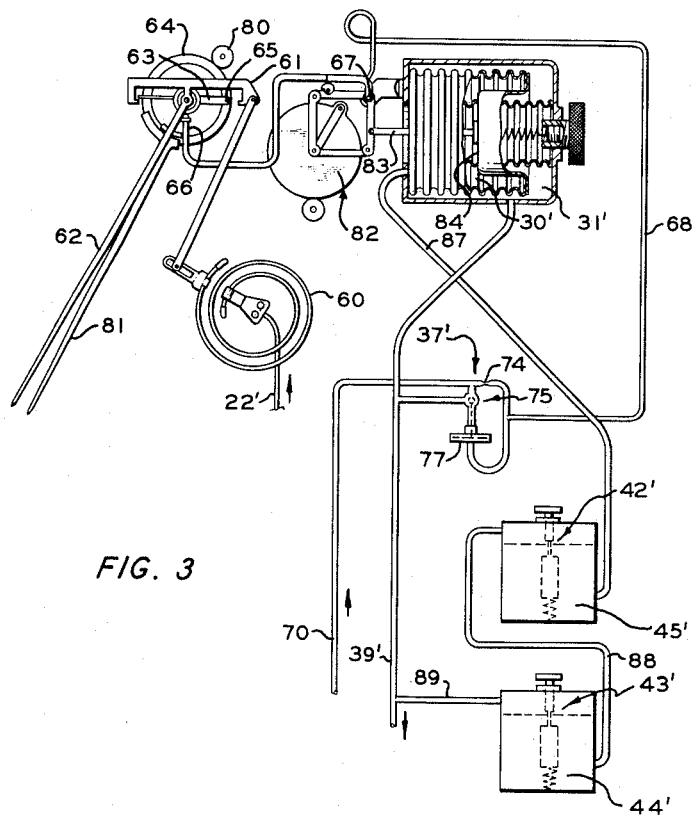
FIGURE 3 is a schematic view of a commercially available pneumatic controller which has been modified in accordance with the present invention.

In FIGURE 3 there is shown a commercially available pneumatic controller which has been modified in accordance with the present invention. The output pressure from transducer 20 of FIGURE 1 is applied to a Bourdon spring 60. The free end of spring 60 is connected to an arm 61 which is pivotally mounted at a point near its center and which carries a pen arm 62 that marks on a recording chart, not shown. A baffle 63 is pivotally attached to a circular disk 64 at a point 65. This baffle is engaged by the left-hand edge of arm 61.

The center portion of baffle 63 is positioned immediately above a nozzle 66 so that the position of the baffle regulates the opening of the nozzle. Nozzle 66 is pivotally mounted at a point 67, and is connected by a conduit 68 to an air relay 37'. Air under pressure is applied to the inlet of relay 37' by means of a conduit 70. A restriction 74 is formed between the inlet of relay 37' and conduit 68. Conduit 70 is also connected through a ball operated valve 75 to an outlet conduit 39' which corresponds to conduit 39 in FIGURE 1. Ball valve 75 is actuated by the pressure in a capsule 77 which communicates with conduit 68.

If the input pressure applied to spring 60 should decrease below the desired set point, spring 60 tends to become more coiled. This pivots arm 61 in a counter clockwise direction so that baffle 63 tends to close nozzle 66. The air pressure in conduit 68 increases so that capsule 77 is inflated to move the ball upwardly to block communication between conduits 70 and 39'. This decreases the output pressure of the controller. If the input pressure should increase, the reverse operation takes place.

The initial set point of the controller can be adjusted by means of a knob 80 which rotates disk 64 to raise or lower pivot point 65. This point is indicated by an arm 81 which is attached to disk 64. Nozzle 66 is also positioned with respect to baffle 63 by means of a parallelogram linkage 82 which serves to rotate nozzle 66 about pivot point 67. This linkage is connected by a rod 83 to a moveable diaphragm 84. The pressure in a first chamber 30' tends to push diaphragm 84 to the right, and the pressure in a second chamber 31' tends to push the diaphragm to the left. Chamber 30' is connected by a conduit 87 to a tank 45' which corresponds to tank 45 of FIGURE 1. Tank 45' is connected by an adjustable valve 42' and a conduit 88 to a second air tank 44'. Tank 44' is connected by a valve 43' and a conduit 89 to outlet conduit 39'. Chamber 31' is connected to conduit 39'. It should be evident that the two chambers separated by diaphragm 84 operate in substantially the same manner as the bellows 30 and 31 of FIGURE 1. The overall operation of the controller of FIGURE 3 is substantially the same as that of the controller of FIGURE 1.

Figure 4:
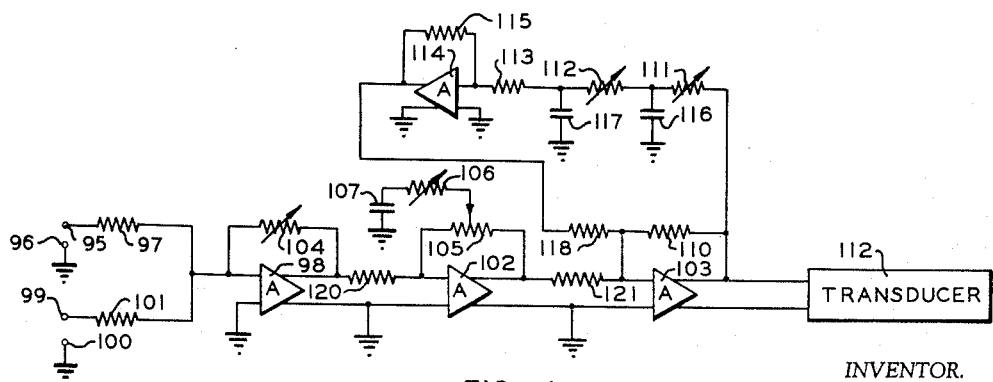
FIGURE 4 is an electrical controller constructed in accordance with this invention.

In FIGURE 4 there is shown an electrical controller constructed in accordance with this invention. This controller responds to an input voltage between terminals 95 and 96, the latter being grounded. Terminal 95 is connected through a resistor 97 to the first input of an amplifier 98. A second voltage of opposite polarity representing the set point of the instrument is applied between second input terminals 99 and 100, the latter being grounded. Terminal 99 is also connected to the first input of amplifier 98 through a resistor 101. The first output terminal of amplifier 98 is connected through a resistor 120 to the first input terminal of a second amplifier 102, and the first output terminal of amplifier 102 is connected through a resistor 121 to the first input terminals of a third amplifier 103. An adjustable feedback resistor 104 is connected between the first output terminal of amplifier 98 and the first input terminal thereof to permit the gain of the amplifier to be adjusted. A potentiometer 105 is connected between the first output terminal of amplifier 102 and the first input terminal thereof. The contactor of potentiometer 105 is connected through an adjustable resistor 106 and a capacitor 107 to ground. Amplifier 102 and the feedback network associated therewith permit the rate of response of the controller to be varied. This type of adjustment is conventional in electrical controllers as is understood by those skilled in the art.

A positive feedback network having a plurality of time lags therein is associated with amplifier 103. This amplifier is provided with a conventional negative feedback resistor 110 between the first output and input terminals.

The first output terminal of amplifier 103 is also connected through resistors 111, 112 and 113 to the input of a unity gain, phase reversal amplifier 114 which has a feedback resistor 115 associated therewith. The junction between adjustable resistors 111 and 112 is connected to ground through a capacitor 116, and the junction between resistors 112 and 113 is connected to ground through a capacitor 117. The first output terminal of amplifier 114 is connected to the first input terminal of the amplifier 104 through a resistor 118. Resistor 111 and capacitor 116 provide the first RC circuit, and resistor 112 and capacitor 117 form the second RC circuit. These two RC circuits constitute the series connected time lags of the controller. Phase reversal amplifier 114 is provided so that the feedback signal through this network constitutes positive feedback in the amplifier. The output signal of amplifier 103 is applied to a conventional transducer 120 which provides a suitable signal for control processes, such as a pneumatic pressure.

In this electrical controller, each RC time lag should not appreciably load the preceding RC time lag. This means that the second lag of FIGURE 4, resistor 112 and capacitor 117, must not draw a significant current from capacitor 116 so as to impair the dynamic response of the first lag, resistor 111 and capacitor 116. This can readily be accomplished by making resistor 112 larger than resistor 111. The same result can also be accomplished by isolating the lags by use of cathode follower amplifiers, for example. Corresponding isolation can be accomplished in the pneumatic controller by use of air relays.

It should thus be evident from the foregoing description that there is provided in accordance with this invention an improved controller which has an overall response that compensates for time lags in the analysis instrument. This type of controller provides a smooth correction to a control action process change and eliminates hunting. The improved characteristics of this controller are accomplished by means of a plurality of time lags connected in series relationship in the reset feedback path of the control instrument.

While the invention has been described in conjunction with present preferred embodiments, it obviously is not limited thereto.

What is claimed is:

1. Control apparatus comprising process controller means to establish an output signal representative of an input signal applied thereto, means responsive to said output signal to apply a negative feedback signal to said means to establish, and means responsive to said output signal to apply a positive feedback signal to said means to establish, said means to apply a positive feedback signal having a plurality of series connected delay means incorporated therein, each of said delay means comprising means to restrict passage of said positive feedback signal followed by a signal storage means for said positive feedback signal.

2. The controller of claim 1 wherein said delay means are adjustable so that preselected amounts of delay can be established by each.

3. A process controller comprising amplifying means to establish an output signal representative of an input signal applied thereto, means responsive to said output signal to apply a negative feedback signal to said amplifying means, means responsive to said output signal to apply a positive feedback signal to said amplifying means, said means to apply a positive feedback signal having a plurality of series connected delay means incorporated therein, each of said delay means comprising means to restrict passage of said positive feedback signal followed by a signal storage means for said positive feedback signal.

4. Control apparatus comprising process controller means to establish an output pneumatic pressure representative of an input signal applied thereto, first conduit means communicating between the output of said means to establish and a first input thereof to transmit said output pressure to said first input as a negative feedback signal, second conduit means communicating between the output of said means to establish and a second input thereof to transmit said output pressure to said second input as a positive feedback signal, a plurality of restrictions in said second conduit means in series relationship with one another, and a plurality of storage means communicating with said second conduit means downstream from said restrictions, respectively.

5. The controller of claim 4 wherein said restrictions are progressively greater proceeding downstream in said positive feedback path.

6. The controller of claim 5 wherein said storage means are progressively smaller proceeding downstream in said positive feedback path.

7. A process controller comprising an amplifier to provide an output electrical signal representative of an input signal applied thereto, a negative feedback network in said amplifier to reduce the gain thereof, a positive feedback network in said amplifier, and a plurality of series connected delay means in said positive feedback network, each of said delay means comprising means to restrict passage of positive feedback signals followed by a signal storage means.

8. The controller of claim 7 wherein said delay means comprise a plurality of resistors connected in series relationship between corresponding first input and output terminals of said positive feedback network, and a plurality of capacitors connected between common second input and output terminals of said positive feedback network and respective terminals of said resistors remote from said first input terminal.

9. The controller of claim 8 wherein said resistors are progressively larger proceeding from said input to said output terminal of said positive feedback network.

10. A process controller comprising a nozzle, first conduit means having a restriction therein communicating with said nozzle to supply air under pressure, a plate positioned adjacent said nozzle so that movement of said plate toward and away from said nozzle tends to block and open said nozzle, respectively, a first expansible member positioned to urge said plate toward said nozzle when expanded, means to introduce air into said first member representative of an input signal, second conduit means, means to establish a pneumatic pressure in said second conduit means representative of the pressure in said first conduit means between said restriction and said nozzle, the pressure in said second conduit means representing the output signal of said controller, a second expansible member positioned to urge said plate away from said nozzle when expanded, third conduit means communicating between said second conduit means and said second member, a third expansible member positioned to urge said plate toward said nozzle when expanded, fourth conduit means communicating between said second conduit means and said third member, a plurality of restrictions in series relationship with one another in said fourth conduit means, and a plurality of chambers communicating with said fourth conduit means on the sides of respective ones of said restrictions adjacent said third member.

11. The controller of claim 10 further comprising adjustable means normally urging said plate away from said nozzle with a predetermined force to establish a set point for the controller.

12. The controller of claim 10 wherein said means to establish a pneumatic pressure in said second conduit means comprises a pneumatic relay.

13. The process controller of claim 1 wherein each of said plurality of delay means in series establishes a progressively larger lag of positive feedback signals than does the preceding delay means.

(References on following page)

References Cited in the file of this patent

UNITED STATES PATENTS

| | | |
|---|---|---|
| 2,245,598 | Llewellyn | June 17, 1941 |
| 2,307,790 | Hoover | Jan. 12, 1943 |
| 2,439,245 | Dunn | Apr. 6, 1948 |
| 2,586,167 | Kamm | Feb. 19, 1952 |
| 2,651,717 | Uttley | Sept. 8, 1953 |
| 2,652,458 | Miller | Sept. 15, 1953 |
| 2,672,529 | Willard | Mar. 16, 1954 |
| 2,743,710 | Shannon | May 1, 1956 |
| 2,776,670 | Hunt | Jan. 8, 1957 |
| 2,805,678 | Panich | Sept. 10, 1957 |
| 2,820,855 | Scherr | Jan. 21, 1958 |
| 2,840,096 | Du Bois | June 24, 1958 |

FOREIGN PATENTS

| | | |
|---|---|---|
| 1,007,532 | Germany | May 2, 1957 |
| 784,506 | Great Britain | Oct. 9, 1957 |

OTHER REFERENCES

Control of Chemical Processes, March 1944, vol. 27, No. 3, Instruments and Automation, pages 440–448 incl.